(12) United States Patent
Sanders et al.

(10) Patent No.: US 6,246,559 B1
(45) Date of Patent: Jun. 12, 2001

(54) POWER CONTROLLER WITH SHORT CIRCUIT PROTECTION

(75) Inventors: Stephen Todd Sanders; Brian John Marsh; Kenneth Vance Bechtold, all of Freeport, IL (US)

(73) Assignee: Honeywell International INC, Morristown, NJ (US)

( * ) Notice: Subject to any disclaimer, the term of this patent is extended or adjusted under 35 U.S.C. 154(b) by 0 days.

(21) Appl. No.: 09/277,099

(22) Filed: Mar. 26, 1999

(51) Int. Cl.[7] ....................................... H02H 3/00
(52) U.S. Cl. ................. 361/93.1; 361/93.2; 361/93.7
(58) Field of Search ................ 361/93.1, 93.2, 361/93.7

(56) References Cited

U.S. PATENT DOCUMENTS 4,612,638 * 9/1986 Kissel ........................................ 371/15
5,510,950 * 4/1996 Bills et al. ............................... 361/93

OTHER PUBLICATIONS

Horowitz & Hill, The Art of Electronics, "MOSFET logic and power switches", FET Switches, 1980. 1989. pp. 166–167. Cambridge U. Press (No Month).

* cited by examiner

Primary Examiner—Michael J. Sherry
(74) Attorney, Agent, or Firm—Roland W. Norris; Andrew A. Abeyta

(57) ABSTRACT

A sensing and control circuit for power line shorts works especially well for sensor or actuator devices controlled through a microcontroller. A power control circuit is placed between a pin of a programmable microcontroller and a sensor or actuator device to act as a short detector and switch to control power to the device. A capacitor in the power control circuit is charged and sensed by a single pin of the microcontroller to regulate a transistor which switches power to the device.

13 Claims, 3 Drawing Sheets

POWER CONTROLLER WITH SHORT CIRCUIT PROTECTION

BACKGROUND OF THE INVENTION

1. Field of the Invention

The invention relates generally to connecting devices such as sensors or actuators to an electronic interconnecting apparatus. The invention relates specifically to an interconnect device having an efficient means for detecting and breaking short circuits in an actuatable device with minimal usage of pins from a microcontroller contained within the interconnect device.

2. Description of the Related Art

Commercial bus devices for industrial usage such as SMART DISTRIBUTED SYSTEM™ by Honeywell Inc. are made for large scale material handling or the like. These bus systems comprise 4-wire buses with two wires for power and 2 wires for communication and control. The bus may operate, for example, a conveyor line having a plurality of sensors for sensing packages and/or a plurality of actuators such as, for example, controllable routers for routing the packages onto and off the conveyor. The sensors and actuators, hereinafter referred to simply as "devices", are often connected to the main bus lines by means of bus interconnect apparatus. These interconnect apparatus can handle a plurality of connections between the main bus line and the devices. The interconnect apparatus can contain microcontrollers for timing and routing signals to the devices. Alternatively, the devices themselves may contain the microcontroller to enable a variety of features such as counting, operator interface enablement, or the like.

It will be appreciated that the devices under discussion need not be connected to a bus, per se. They could for example be stand alone devices, or grouped devices, operating without the benefit of a full communications bus architecture. Therefore the term "bus" as used herein is better thought of in its broadest sense as a "communications or data line" which enables a sensing and control assemblage, or network, to communicate the data produced by the sensor or which carries the actuation pulses to the actuators.

In order to keep the cost of the devices or their interconnect apparatus low, while maximizing the features, great efficiency should be exercised in the use of the pin assignments on the microcontroller to enable the use of the least expensive microcontroller for the tasks at hand.

In the case where a device short circuits, it is desirable that the device be turned off as rapidly as possible in order to avoid damage to any of the components in the devices or interconnect apparatus, and also eliminate power drains, incorrect information, or false actuations.

In the past, short circuit sensing and control mechanisms have less efficiently utilized the microcontroller contained within the interconnect device. However, as previously stated, it is desirable to utilize the least amount of microcontroller pins in order to achieve such functionality. Further, a typical prior device would utilize an interrupt detection method which slows reaction time to short circuit conditions, as well as consuming valuable microcontroller resources in the form of software interrupts to the I/O pins of the microcontroller.

Therefore, it is desirable to have a means for more immediately detecting and shutting down short circuited sensing and control network devices while utilizing the least number of microcontroller pins.

SUMMARY OF THE INVENTION

The present invention in a first embodiment includes a short circuit detect and control circuit placed between a microcontroller and its sensor or actuator device for sensing short circuits in the device and immediately removing power thereto to protect the sensing and control network. This may be accomplished by means of an active switch such as a FET circuit placed in the power line and controlled by circuitry for biasing the active switch. One pin of the microcontroller activates the control circuitry via a pulse to a capacitor, enabling the active switch. The microcontroller then utilizes the same pin thereof to sense the condition of the current sensing circuit to determine a short has occurred. When excessive current is detected, the active switch is immediately shut down. In a full bus arrangement the microcontroller, having detected this situation, can report back to the bus system controller.

In another embodiment of the invention, the invention includes the bus device interconnect system utilizing the active switch and short circuit detect and control circuit in order to provide an efficient and inexpensive means for controlling short circuit conditions in an industrial bus application.

DETAILED DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
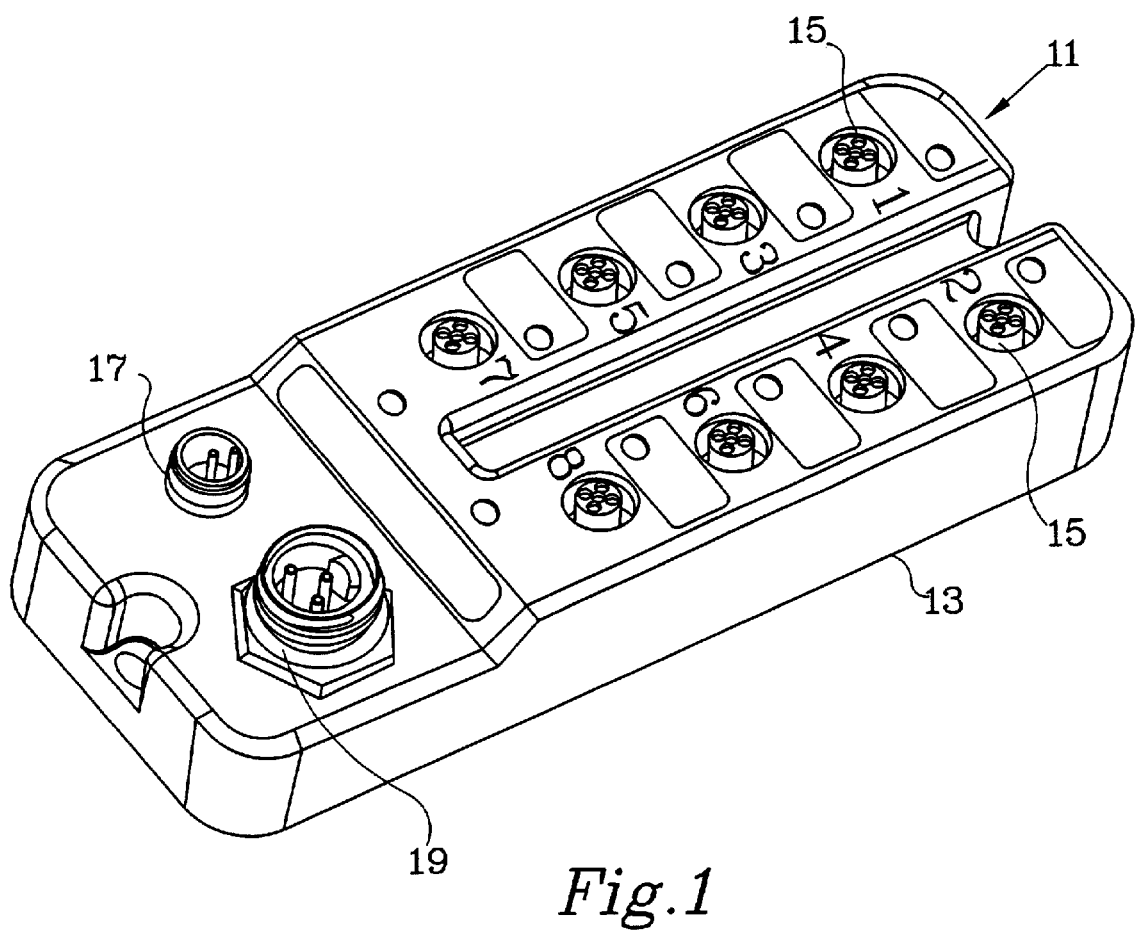
FIG. 1 is a perspective view of a sensing and control network interconnect apparatus exterior according to the present invention.

Throughout the Description of the Preferred Embodiment, like components will be identified by like reference numerals.

Referencing FIG. 1, an industrial sensing and control network bus interconnect apparatus 11 has a case 13 supporting a multiplicity of connectors 15 to which sensors or actuatable devices such as, package diverters, or the like, may be connected. A connector 17 for power and communications connection to the main bus is also provided. A third connector 19 is provided for power supply to the internal circuitry of the bus interconnect apparatus 11.

Figure 2:
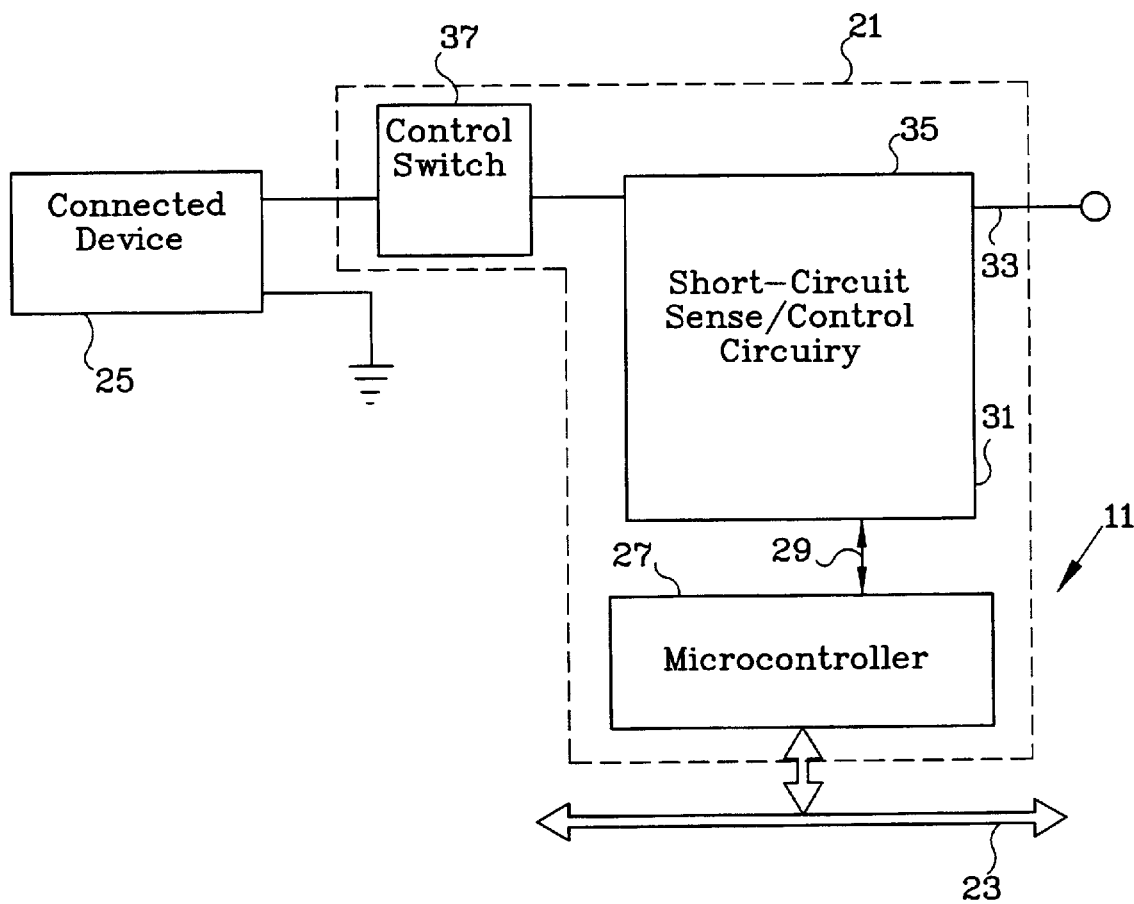
FIG. 2 is a block diagram detailing the major components of the detect and control system circuit as related to the interconnect apparatus microcontroller and the connected device.

Referencing the block diagram of FIG. 2, the bus interconnect apparatus 11 is surrounded by a dashed line 21. The communication bus, or other communications line for a sensing and control network, 23 is shown connected to the microcontroller 27. The sensor or actuator device 25, again hereinafter referred to collectively as the "device" 25, is shown as connected to another side of the bus interconnect apparatus 11. Appropriate power connections from the bus and from the separate power supply necessary for powering the components internal to the interconnect apparatus have been left off for clarity of illustration, but are within the ordinary skill of the art.

As stated, connected to communications bus is a microcontroller 27 for controlling the plurality of connected devices, such as device 25, which may be connected to the interconnect apparatus 11. The microcontroller manages timing cycles and information management between the interconnect apparatus 11 and the main bus controller (not shown). Individual devices in a sensing and control network may of course have individual microcontrollers therein. The microcontroller 27 is connected through a single pin or electrical run 29 to the short circuit detect and control circuitry 31 as further explained below. The short circuit detect and control circuit 31 is connected in the voltage power line 33 between the main power bus and the power lines to the actuatable device 25. The short circuit detect and control circuitry includes current sensing portions 35 and a controllable switch 37. Thus, there is interposed between the microcontroller and the actuatable device, separate circuitry for controlling power to the actuatable device with utilization of only one pin of the microcontroller 27 and providing short circuit sensing and control on an instantaneous basis as further explained below.

Figure 3:
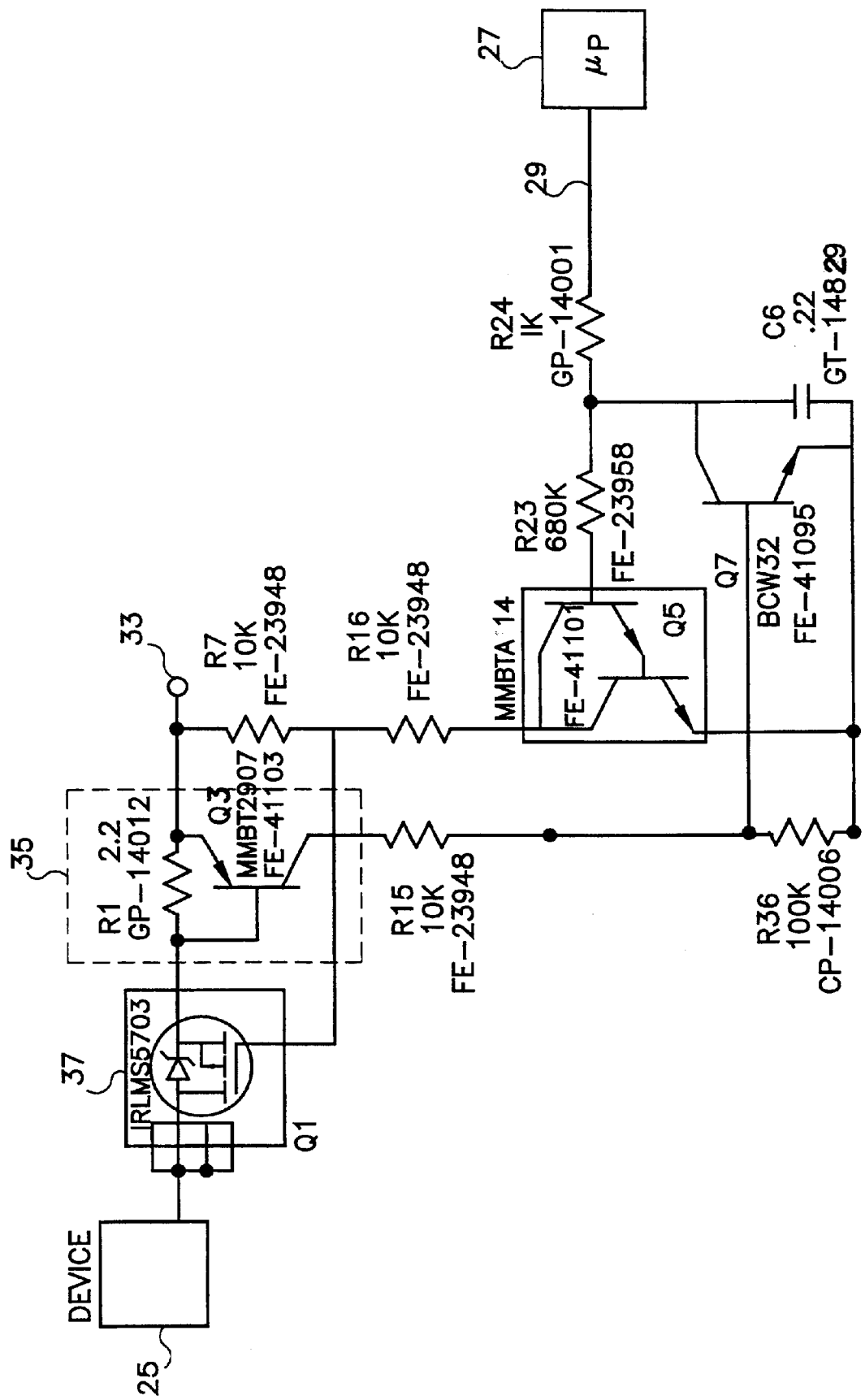
FIG. 3 is a detailed electrical schematic of the current sensing and active switch portions of the short circuit detect and control circuitry of the present invention.

Referencing FIG. 3, the control switch 37 is represented by P-Channel enhancement-mode FET, such as IRLMS5703 from International Rectifier, circuit 39 labeled as Q1. The choice for the P-Channel enhancement-mode FET is necessary for the operation of the circuit as configured. This is necessary so that the normal condition of the FET is off until activated by applying a negative Gate to Source voltage. The gate is pulled low when Q5 turns on thus enabling the FET to pass current to the connected device.

The remaining components are part of the current sensing circuit of the short circuit detect and control circuitry. Connected to the single pin or line 29 of the microcontroller 27 through the 1 KΩ resistor R24 is a 0.22f capacitor C6 which is the charge and hold capacitor for the current sensing circuit. Connected on either side of the sense and hold capacitor C6 is the emitter and collector of transistor Q7 which, when turned on, quickly drains the capacitor C6. C6 is connected to the base of a Darlington transistor Q5, the collector of which is connected to the gate of the control switch Q1. Transistor Q3 is connected through R1 at its emitter to the source of Q1 and at its collector to the base of Q7 through biasing resistors R15 and R36. Microcontroller 27, at its single pin 29, pulses the pull-up-and-hold capacitor C6 which turns on Q5, which pulls the gate of Q1 low, turning on the active switch and putting power to the device 25. Should the device 25 short and begin overdrawing current, the increased voltage drop across R1 will turn on Q3 and increase the current through R15 thereby putting a base drive on Q7 and turning on Q7 to quickly drain capacitor C6. It will be appreciated that power is shut down wherever a short circuit occurs beyond the power input to the device circuit, so that when the phrase "short circuit in the device" is used, the reader will understand that such short circuit may occur anywhere in the device circuit, not just the device itself, in order to activate the detect and control circuit of the present invention.

The microcontroller 27 is programmed to check the voltage on C6 utilizing a high impedance phase so that C6 does not discharge through the pin 29. When the voltage check reveals that the capacitor has drained, it recognizes a shorted condition and takes appropriate measures to indicate to the operator and system controller that the event has occurred. In the meantime, power to the device 25 has been shut down through control switch 37 as soon as the capacitor C6 has drained. Alternative embodiments may have application specific integrated circuits, multivibrators, timing ICs, or the like, where the application does not require the functionality of the microcontroller.

Thus it will be recognized that two important functionalities are obtained with the short circuit detect and control circuit of the present invention. First, short circuit control to the device 25 is placed outside the microcontroller, and second, all short circuit sensing and control functionality is accomplished through utilization of only one pin of the microcontroller.

It will be recognized that the short circuit detect and control circuit of the preferred embodiment may have other applications not strictly limited to the control of an actuatable device in an industrial bus system. Many such utilizations and variations on the present invention and its basic structure will occur to those skilled in the art. Accordingly, the present invention is to be limited only by the appended claims.

Having thus described the invention what is claimed is:

1. A circuit for detecting and controlling short circuits in a sensing or control device, wherein the device is connected to a power line, comprising:
   a) a short circuit detect and control circuit and a microcontroller connectable between a communications line and a power line;
   b) the short circuit detect and control circuit placed between the microcontroller and the sensing or control device;
   c) the detect and control circuit having an active switch connectable into the power line for controlling power to the device; and
   d) a current sensing circuit connected to the active switch for controlling the active switch, the current sensing circuit including means for powering and monitoring the control circuit from one pin of the microcontroller;
   e) whereby the detecting and control circuit senses short circuits in the device and shuts off power thereto in the event of a short circuit.

2. The circuit for detecting and controlling short circuits of claim 1 wherein the current sensing circuit further comprises a capacitor charged and monitored from the one pin of the microcontroller.

3. The circuit for detecting and controlling short circuits of claim 2 wherein the current sensing circuit further comprises active electronic components electrically connected to the capacitor for biasing the active switch.

4. A circuit for detecting and controlling short circuits in a sensing or control device, wherein the device is connected to a power line, comprising:
   a) a short circuit detect and control circuit and a microcontroller connectable between the device and the power line;
   b) the short circuit detect and control circuit placed between the microcontroller and the device;
   c) the short circuit detect and control circuit having an active switch connectable into the power line for controlling power to the device;
   d) a current sensing circuit connected to the active switch for controlling the active switch, the current sensing circuit including a capacitor charged and sensed from one pin of the microcontroller, and active electronic components electrically connected to the capacitor for biasing the active switch; and
   e) whereby the short circuit detect and control circuit senses short circuits in the device and shuts off power to the device in the event of a short circuit.

5. The circuit according to claim 4 wherein: the active switch is a FET.

6. The circuit according to claim 4 wherein: the short circuit detect and control circuit includes a transistor (Q5) whose collector is connected to the gate of the active switch, and wherein the active switch is a FET.

7. The circuit according to claim 4 wherein: the short circuit detect and control circuit includes a first transistor (Q7) whose collector and emitter are connected on opposite sides of the capacitor.

8. The circuit according to claim 7 wherein: the short circuit detect and control circuit includes a second transistor (Q3) whose collector is electrically connected to the base of the first transistor (Q7).

9. The circuit according to claim 4 wherein:
   the microcontroller is selected from a group including: programmable microcontrollers, application specific integrated circuits, timers, and multivibrators.

10. The circuit according to claim 9 wherein:
    the microcontroller controls a plurality of sensors/devices, each having its own short circuit detect and control circuit.

11. A control bus interconnect device for connecting a sensor or control device to a power and communications bus comprising:
    a) a first connector for attaching the sensor or control device to the interconnect device;
    b) a second connector for attaching the interconnect device to the bus;
    c) a short circuit detect and control circuit connectable between the first and second connectors for sensing short circuits and shutting off power thereto in the event of a short circuit at or beyond the first connector;
    d) wherein the short circuit detect and control circuit further comprises:
       i) a microcontroller operatively connected between the first and second connectors;
       ii) the current sensing circuit operatively connected to the microcontroller by a single pin;
    e) said short circuit detect and control circuit configured to shut off power when said single pin of said microcontroller is used in either a high impedance monitoring mode or a low impedance driving mode.

12. A control bus interconnect device for connecting a sensor or control device to a power and communications bus comprising:
    a) a first connector for attaching the sensor or control device to the interconnect device;
    b) a second connector for attaching the interconnect device to the bus;
    c) a short circuit detect and control circuit connectable between the first and second connectors for sensing short circuits and shutting off power thereto in the event of a short circuit at or beyond the first connector;
    d) wherein the short circuit detect and control circuit further comprises:
       i) a current sensing circuit, an active switch, and a microcontroller connectable between the first and second connectors;
       ii) the microcontroller connected to a communications part of the bus;
       iii) the current sensing circuit connected to the microcontroller by a single pin and connected between a power part of the bus and the active switch; and
       iv) the current sensing circuit including a capacitor charged and sensed from the one pin of the microcontroller, and active electronic components electrically so connected to the capacitor for biasing the active switch.

13. In a method for connecting sensor or control devices to a power and communications bus, the sensor or control device receiving and sending commands through a microcontroller connected to the communications portion of the bus and receiving power from the power source, the improvement comprising:
    a) connecting a short circuit sensing and control circuit between the microcontroller and the power portion of the bus, the short circuit sensing and control circuit having a current sensing circuit for sensing short circuits in the sensor or control device;
    b) connecting an active switch to the current sensing circuit for removing power to the sensor or control device in the event of a short circuit therein;
    c) the current sensing circuit including a capacitor charged and sensed from one pin of the microcontroller, and active electronic components electrically connected to the capacitor for biasing the active switch.

* * * * *